United States Patent
Karaki et al.

(10) Patent No.: US 9,080,605 B2
(45) Date of Patent: *Jul. 14, 2015

(54) SLIDING BEARING HAVING SELF-LUBRICATING LINER

(71) Applicant: Minebea Co., Ltd., Kitasaku-gun, Nagano (JP)

(72) Inventors: Tadahiko Karaki, Kitasaku-gun (JP);
Kentaro Ishikawa, Kitasaku-gun (JP);
Motoharu Akiyama, Kitasaku-gun (JP);
Kunihiro Matsumoto, Kitasaku-gun (JP)

(73) Assignee: MINEBEA CO., LTD., Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/185,251

(22) Filed: Feb. 20, 2014

(65) Prior Publication Data

US 2014/0169713 A1    Jun. 19, 2014

Related U.S. Application Data

(62) Division of application No. 13/089,801, filed on Apr. 19, 2011, now Pat. No. 8,690,438.

(30) Foreign Application Priority Data

Apr. 27, 2010  (JP) .................................. 2010-102769
Apr. 13, 2011  (JP) .................................. 2011-089334

(51) Int. Cl.
*F16C 33/18*   (2006.01)
*F16C 23/04*   (2006.01)
(Continued)

(52) U.S. Cl.
CPC ............. *F16C 33/043* (2013.01); *F16C 33/201* (2013.01); *F16C 33/208* (2013.01);
(Continued)

(58) Field of Classification Search
CPC .... F16C 33/208; F16C 33/201; F16C 33/043; F16C 43/02; F16C 2220/06; F16C 2208/02; F16C 2208/36; F16C 23/043

USPC ......... 384/276, 280, 297, 300, 206, 213, 911, 384/908
See application file for complete search history.

(56) References Cited

U.S. PATENT DOCUMENTS 3,008,779 A    11/1961  Spriggs
3,507,527 A     4/1970  White
(Continued)

FOREIGN PATENT DOCUMENTS

AT    328 799 B     4/1976
DE    36 01 569 A1  7/1987
(Continued)

OTHER PUBLICATIONS

Oct. 7, 2014 Notice of Rejection issued in Japanese Application No. 2011-089334 with English-language translation.

(Continued)

*Primary Examiner* — Alan B Waits
(74) *Attorney, Agent, or Firm* — Oliff PLC

(57) ABSTRACT

A sliding bearing having a metallic outer ring and a self-lubricating liner formed on the inner circumferential surface of the outer ring. The self-lubricating liner has a self-lubricating resin composition consisting of a mixture of 60 to 80% by weight of polyetherketone-based resin, 10 to 30% by weight of polytetrafluoroethylene, 5 to 15% by weight of carbon fiber, and not more than 15% by weight of aramid fiber, a total amount of the carbon fiber and the aramid fiber being 10 to 25% by weight. The inner circumferential surface of the outer ring has a surface roughness in terms of center line average roughness not less than $R_a$ 4.0 μm and a surface roughness in terms of maximum height not less than $R_{max}$ 30.0 μm; and the outer ring and the self-lubricating liner are unified. A method of producing the bearing is also provided.

14 Claims, 4 Drawing Sheets

(51) Int. Cl.
  *F16C 33/04* (2006.01)
  *F16C 33/20* (2006.01)
  *F16C 43/02* (2006.01)
  *F16C 17/02* (2006.01)
  *F16C 11/06* (2006.01)

(52) U.S. Cl.
  CPC ............ *F16C 43/02* (2013.01); *F16C 11/0614* (2013.01); *F16C 17/02* (2013.01); *F16C 23/043* (2013.01); *F16C 2208/02* (2013.01); *F16C 2208/36* (2013.01); *F16C 2220/06* (2013.01)

(56) References Cited

U.S. PATENT DOCUMENTS

| | | |
|---|---|---|
| 4,847,135 A | 7/1989 | Braus et al. |
| 5,688,054 A | 11/1997 | Rabe |
| 5,998,339 A | 12/1999 | Kato et al. |
| 6,089,755 A | 7/2000 | Okamoto et al. |
| 6,180,574 B1 | 1/2001 | Ryan et al. |
| 6,332,716 B1 | 12/2001 | Kato et al. |
| 6,528,143 B1 | 3/2003 | Adam et al. |
| 8,083,414 B2 | 12/2011 | Tsuji et al. |
| 2005/0281498 A1 | 12/2005 | Hayashi et al. |
| 2006/0228505 A1 | 10/2006 | Goto et al. |
| 2007/0223850 A1 | 9/2007 | Lopes et al. |
| 2007/0264482 A1 | 11/2007 | Banker et al. |
| 2009/0065967 A1 | 3/2009 | Clune |
| 2011/0164840 A1 | 7/2011 | Hayashi et al. |

FOREIGN PATENT DOCUMENTS

| | | |
|---|---|---|
| DE | 43 11 634 A1 | 10/1993 |
| DE | 196 03 353 A1 | 8/1997 |
| DE | 698 03 765 T2 | 10/2002 |
| DE | 10 2009 010 459 A1 | 8/2010 |
| EP | 1 526 296 A2 | 4/2005 |
| JP | U-57-67118 | 4/1982 |
| JP | A-2002-323044 | 11/2002 |
| JP | A-2004-011748 | 1/2004 |
| JP | A-2006-009819 | 1/2006 |
| JP | A-2007-232145 | 9/2007 |
| JP | A-2007-255712 | 10/2007 |
| JP | 2008-133954 A | 6/2008 |
| WO | WO 98/57803 A1 | 12/1998 |

OTHER PUBLICATIONS

German Search Report issued in German Patent Application No. 10 2011 002 290.2 dated Oct. 21, 2011 (with translation).
Mar. 3, 2015 Notification of Reasons for Rejection issued in Japanese Application No. 2011-089334.

SLIDING BEARING HAVING SELF-LUBRICATING LINER

This is a divisional of application Ser. No. 13/089,801 filed Apr. 19, 2011, and claims the benefit of Japanese Patent Application Nos. 2010-102769 and 2011-089334 filed Apr. 27, 2010 and Apr. 13, 2011. The entire disclosures of the prior applications are hereby incorporated by reference herein in their entirety.

BACKGROUND

The present invention relates to a self-lubricating sliding bearing and, more in particular, relates to a self-lubricating liner composition used on a sliding surface of the self-lubricating sliding bearing.

Among bearings for supporting a shaft of rotary motion, a sliding bearing in which the shaft is held by a cylindrical sliding surface has been widely used conventionally and, in particular, a self-lubricating sliding bearing in which a lubricating oil or the like is not necessary on the lubricating surface, has been used for applications requiring low friction coefficient, high durability, high load capacity, high heat resistance, high oil resistance and the like, such as aircraft application.

For example, a spherical bearing $B_5$ for use in high load condition, consisting of an outer ring member 13 having a concave first sliding surface and an inner ring member 32 having a convex second sliding surface which is slidable with the first sliding surface, as shown in a sectional view in FIG. 5, is well known (See patent document 1).

In this spherical bearing, one member is made of titanium alloy, and it has a sliding surface treated with titanium nitride applied by a physical vapor deposition method (PVD). The other sliding surface is provided with a self-lubricating liner 23. The self-lubricating liner 23 is composed of a fabric consisting of weaved fibers of PTFE (Polytetrafluoroethylene) and polyaramid. The fabric is saturated with phenol resin. A self-lubricating sleeve bearing in which a similar fabric type self-lubricating liner is bonded on the inner sliding surface has been widely known as a conventional technique.

In addition, a self-lubricating coating consisting of a thermosetting acrylic composition containing 20% by weight or more of dipentaerythritolpentaacrylate and 10% by weight or more of solid lubricating agent such as polytetrafluoroethylene, is disclosed (See patent document 2).

The patent document 2 discloses that 20% by weight or more of triethyleneglycol dimethacrylate and 1% by weight or less of aramid pulp can be added to the self-lubricating coating. Furthermore, a sleeve bearing $B_6$ in which the self-lubricating coating is arranged on the inner sliding surface of the outer ring 14 as the liner 24 shown in FIG. 6 is disclosed.

Furthermore, a sliding bearing for rotatably supporting a rotary shaft of an impeller of a cooling water circulating pump arranged with a fuel cell, in which the constitutional material of the sliding bearing is a synthetic resin such as polyetherketone-based resin free of metallic ion, is disclosed (See patent document 3).

In the patent document 3, polyetheretherketone (PEEK) is mentioned as the synthetic resin not containing metallic ion. To improve the mechanical strength and frictional wearing property of such polyetherketone-based resin, it is desirable to add a fibrous filler such as carbon fiber or aramid fiber and a solid lubricating agent such as fluorine resin or graphite. The fillers may be added at 3 to 60 parts by weight to 100 parts by weight of polyetherketone-based resin. The desirable addition amount of the carbon fiber is 5 to 40 parts by weight to 100 parts by weight of polyetherketone-based resin, and more desirably 10 to 30 parts by weight. As the solid lubricating agent, fluorine resin powder such as PTFE, PFA or the like, and graphite or the like are disclosed. The addition amount of the solid lubricating agent is 1 to 40 parts by weight, desirably 5 to 30 parts by weight, and more desirably 5 to 20 parts by weight to 100 parts by weight of polyetherketone-based resin. The above-mentioned materials for molding are mixed, plasticized by heating until the temperature range of 400 to 420° C., filled into a mold, solidified, and released, to obtain a sliding bearing of cylindrical plastic body.

Patent document 1: Japanese Unexamined Patent Application Publication No. 2007-255712

Patent document 2: U.S. Pat. No. 6,180,574

Patent document 3: Japanese Unexamined Patent Application Publication No. 2006-9819

Since the sliding bearings disclosed in the patent documents 1 and 2 are used in aircrafts, high load capacity, heat resistance, and oil resistance, in addition to low frictional coefficient, are required. Furthermore, for the airframe manufacturers it is convenient that, during an assembling process of a sliding bearing like a sleeve bearing, the fit-adjustment can be performed by adjusting the size of sliding surface diameter of the sleeve bearing by grinding or cutting, instead of performing size adjustment of the shaft diameter.

However, since the fabric type self-lubricating liner disclosed in patent document 1 contains weaved fibers saturated with resin, its diameter size cannot be adjusted by grinding or cutting process because the fibers may be cut and therefore the weaved liner would be damaged.

In addition, productivity of the self-lubricating coating disclosed in patent document 2 is low since it is based on thermosetting acrylic resin.

Furthermore, the sliding bearing disclosed in patent document 3 does not have sufficient strength to be used in an airframe since the sliding bearing are entirely made of resin. In addition, although a resin material free of metallic ions is suitable as a sliding bearing to rotatably support the rotary shaft of an impeller in a cooling water circulating pump, it is uncertain about the use in aircraft application where high load capacity, heat resistance, oil resistance and the like are required.

SUMMARY

The present invention was conceived considering the above circumstances, and an object of the present invention is to provide a metallic sliding bearing having a self-lubricating liner, wherein the liner has low frictional coefficient, high durability, high load capacity, high heat resistance and high oil resistance, and in which the diameter size can be adjusted by grinding or cutting. It should be noted that the self-lubricating liner according to the present invention may be hereinafter simply referred to as a "machinable liner" (processable liner) since the size can be adjusted by a machining process.

A sliding bearing of the present invention is characterized in that the sliding bearing has a metallic outer ring and a self-lubricating liner formed on an inner circumferential surface of the outer ring. The self-lubricating liner is a self-lubricating resin composition consisting of a mixture of 60 to 80% by weight of polyetherketone-based resin, 10 to 30% by weight of polytetrafluoroethylene, 5 to 15% by weight of carbon fiber and not more than 15% by weight of aramid fiber, wherein the total amount of the carbon fiber and the aramid fiber is 10 to 25% by weight, the inner circumferential surface of the outer ring has a surface roughness in terms of average center line roughness not less than $R_a$ 4.0 μm and a surface roughness in terms of maximum height of not less than $R_{max}$ 30.0 μm, and the outer ring and the self-lubricating liner are integrated. The surface roughnesses $R_a$ and $R_{max}$ are as defined in Japanese Industrial Standard JIS B0601:2001.

Furthermore, the manufacturing process of the sliding bearing according to the present invention is characterized in that the process includes a step of surface treatment of the inner circumferential surface of the metallic outer ring so that after the treatment the surface roughness in terms of center line average roughness is not less than $R_a$ 4.0 μm and the surface roughness in terms of maximum height is not less than $R_{max}$ 30.0 μm, a step of mixing 60 to 80% by weight of polyetherketone-based resin, 10 to 30% by weight of polytetrafluoroethylene, 5 to 15% by weight of carbon fiber and not more than 15% by weight of aramid fiber, so that the total amount of the carbon fiber and the aramid fiber is 10 to 25% by weight, to obtain a self-lubricating liner resin composition, and a step of injection molding the resin composition to form the self-lubricating liner onto the inner circumferential surface of the outer ring.

In the present invention, it is desirable that the inner circumferential surface of the outer ring be curved toward the inside or outside, i. e., the inner diameter of the outer ring decreases or increases from an edge part toward an axially central part of the outer ring, and that the inner circumferential surface of the self-lubricating liner be cylindrical.

According to the present invention, since the self-lubricating liner does not contain any weaved fabric, processing of the sliding surface such as grinding, cutting or the like for closely fitting the bearing to the shaft, which is impossible to perform in a conventional fabric type liner containing PTFE, can be performed. In addition, by using a polyetherketone-based resin, which is a heat-resistant thermoplastic resin, as a matrix, higher productivity than using a conventional self-lubricating coating based on a thermosetting acrylic resin is realized because the injection molding process becomes possible. Furthermore, since the structural part of the bearing is made of metal and only the sliding surface is made of the self-lubricating liner, the strength is greatly improved compared to the conventional bearing in which the entire body is made of resin. In addition, the separation of the metallic outer ring and the liner is prevented by optimizing the surface roughness of the outer ring inner circumferential surface.

DETAILED DESCRIPTION OF THE EMBODIMENTS

Embodiments of the invention are hereinafter explained in detail.

FIG. 1 shows a sliding bearing of an embodiment of the invention. The sliding bearing $B_1$ is a sleeve bearing having a structure in which a layer of self-lubricating liner 20 is formed on an inner circumferential surface of a metallic outer ring 10. Since the surface roughness of the inner circumferential surface of the metallic outer ring 10 is optimized as explained below, the metallic outer ring 10 and the self-lubricating liner 20 are firmly unified. Therefore, even if a high load is generated between the outer ring and the shaft (or inner ring in the case of a spherical bearing) which is held by the outer ring, the separation of the self-lubricating liner layer is prevented. Since the structural element of the sleeve bearing, i. e., the outer ring itself is made of metal, problems such as excessive deformation can be prevented even under high load condition. As a result, long term durability of the bearing is improved.

Figure 1A:
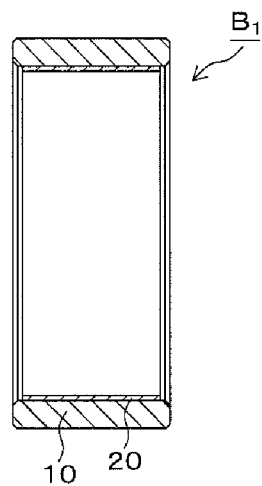
FIG. 1A is a sectional view showing a bearing of an embodiment of the invention.
Figure 1B:
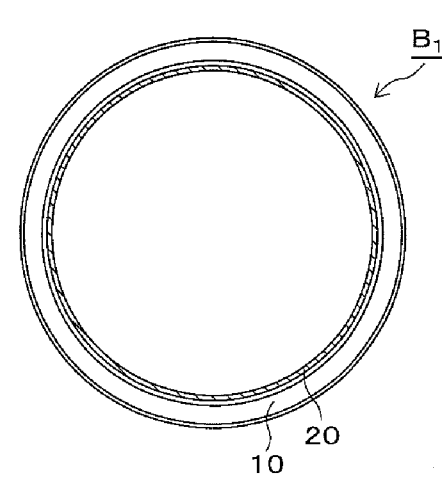
FIG. 1B is a plane view thereof.
Figure 2A:
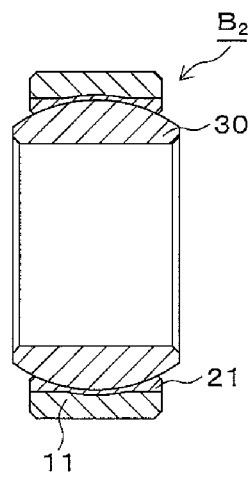
FIG. 2A is a sectional view showing a bearing of another embodiment of the invention.
Figure 2B:
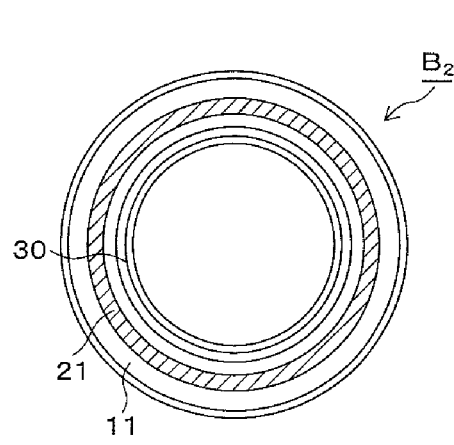
FIG. 2B is a plane view thereof.
Figure 3A:
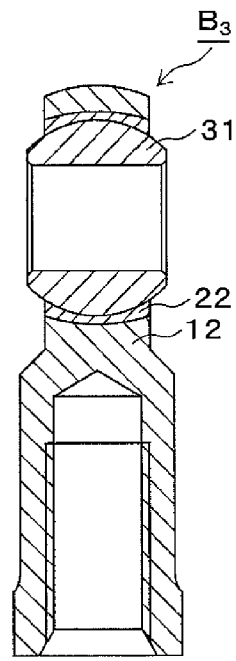
FIG. 3A is a sectional view showing a bearing of another embodiment of the invention.
Figure 3B:
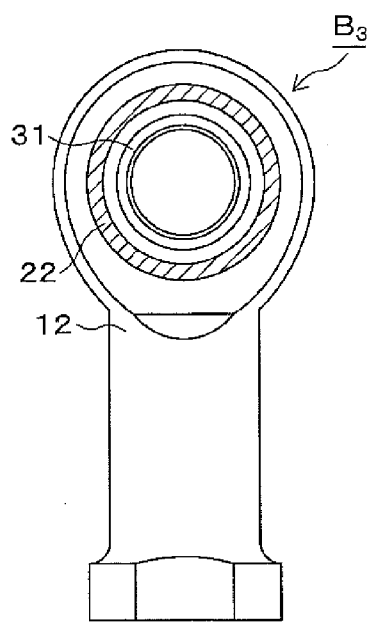
FIG. 3B is a plane view thereof.

In the sleeve bearing $B_1$ shown in FIGS. 1A and 1B, the outer ring 10 has a cylindrical inner circumferential surface, and the liner 20 is depicted as a straight line in the sectional view of FIG. 1A. However, as shown in FIGS. 2A and 2B, the present invention can be applied also in the case of a spherical bearing $B_2$ in which the surface of the liner 21 is depicted as an arc in the sectional view of FIG. 2A and the inner circumferential surface of the outer ring 11 is spherical. In this bearing, the outer ring 11 holds an inner ring 30 having a spherical outer circumferential surface and a central through hole. The inner diameter of the outer ring 11 is larger than the outer diameter of the inner ring 30. The axially central part of the outer ring inner circumferential surface is slightly concave so as to maintain the thickness of the liner 21. In addition, like in a rod end type spherical bearing $B_3$ shown in FIGS. 3A and 3B, the outer ring 11 can be replaced by an outer ring member 12 having a screw part extending in radial direction for connecting to a device in which the bearing $B_3$ is assembled. The outer ring member 12 holds an inner ring 31 via a self-lubricating liner 22.

Next, each constitutional element of the invention is explained.
1. Bearing According to the Present Invention As a sliding bearing according to the present invention, a plain or flanged sleeve bearing whose sleeve inner circumferential surface is the sliding surface can be mentioned. In the flanged sleeve bearing, the flange surface can also be a sliding surface in addition to the inner diameter sliding surface. The machinable liner according to the present invention is formed on the sliding surface by insert molding. In addition, also a spherical bearing can be mentioned as a sliding bearing according to the present invention. The spherical bearing is structured by combining an outer ring having a sliding surface in which the machinable liner is fixed to the concave spherical inner circumferential surface, and an inner ring having a convex spherical outer circumferential surface and a central hole for inserting a shaft. In both cases, the metallic surface on which the machinable liner is fixed is pretreated by an alumina thermal spray process or a blast process using alumina, silica or zirconia as a medium prior to the injection molding so as to produce a surface roughness corresponding to a center line average roughness not less than $R_a$ 4.0 μm and a maximum height not less than $R_{max}$ 30.0 μm. In the case of the spherical bearing having the outer ring and the inner ring, after combining the outer ring and the inner ring, the machinable liner resin in a melted condition is injected between them and solidified to unify with the outer ring. The surface roughness of the outer circumferential surface of the inner ring should be small so as to avoid the adhesion of the liner. In addition, the sliding bearing of the present invention is made of metal since high strength is required for aircraft application.

2. Sliding Surface Consisting of Machinable Liner Fixed on the Inner Circumferential Surface The component ratio of the machinable liner in the self-lubricating sliding bearing according to the present invention is 60 to 80% by weight of polyetherketone-based resin (PEEK, PEK), 10 to 30% by weight of PTFE powder (solid lubricating agent), 5 to 15% by weight of carbon fiber and 15% by weight or less of aramid fiber, wherein the total amount of the carbon fiber and the aramid fiber is 10 to 25% by weight.

3. Polyetherketone-Based Resin (Thermoplastic Resin)

The present invention includes the machinable liner in which the polyetherketone-based resin, a crystalline resin having superior sliding property, heat resistance and chemical resistance among the thermoplastic resins, is used as the base polymer. As a conventional technique, a machinable liner having thermosetting resin (acrylic resin) as the base polymer is known. However, thermosetting resin can not be used in a low cost injection molding process. In the present invention, thermoplastic resin is used considering its superior productivity and recycling possibility. Since polyetherketone-based resin is a thermoplastic resin and therefore injection molding can be performed, the bearing can be mass-produced easily. The liner used in a sliding bearing of an aircraft is required to have superior heat resistance and oil resistance (fluid compatibility) according to the SAE standard AS81934, as explained below, and, in the present invention, the thermoplastic resins other than polyetherketone-based resin could not meet the requirement.

4. High Molecular Weight Type PTFE (Solid Lubricant)

Sliding property of the machinable liner can be improved by mixing polyetherketone-based resin and PTFE. In the present invention, PTFE of high molecular weight is used. Heating at a temperature above the polyetherketone-based resin melting point of about 340° C. is necessary to mix with the polyetherketone-based resin. Therefore, in order to avoid the decomposition of PTFE even at a temperature above 340° C., it is necessary to use PTFE of high molecular weight type (molecular weight not less than about 1 million) which is completely burned and unlikely to generate decomposition gas.

The addition amount of PTFE should be 10 to 30% by weight in order to satisfy the required sliding property. If the addition amount is less than 10% by weight, the load capacity requirement at room temperature in SAE standard AS81934 is satisfied but the requirement at high temperature (121° C. (250° F.), 163° C. (325° F.)) is not satisfied. Furthermore, if the addition amount of PTFE exceeds 30% by weight, negative effects of the PTFE decomposition gas becomes significant during mixing with polyetherketone-based resin and during injection molding process. Defects of liner formation caused by generation of pores in the molded product, and corrosion of the mold caused by the gas (HF) generated from PTFE decomposition becomes significant during injection molding. Therefore, an appropriate addition amount of PTFE is 10 to 30% by weight.

5. PAN Type Carbon Fiber (CF)

As a CF, general-purpose polyacrylonitrile (PAN) type CF (strength: 4000 MPa, elasticity modulus: 240 GPa) is adopted as reinforcement fiber and used as the reinforcement material to compensate the material strength reduction caused by softening of resin particularly at high temperatures (121° C. and 163° C.). The addition amount to satisfy the required property is 5 to 15% by weight. In the case where the addition amount exceeds 15% by weight, particles are generated by wear in significant quantity during sliding movement causing abrasive wear, and service life is adversely affected. It should be noted that, as shown below in the Comparative Examples, the pitch type CF cannot satisfy the required characteristics.

6. Aramid Fiber (AF)

As an AF, chopped fiber and/or milled fiber can be mixed and used. Since AF has greater rupture elongation than CF (AF: about 5%, CF: about 2%) although AF has lower strength and elasticity modulus than CF, by mixing the chopped fiber and/or milled fiber, toughness of the machinable liner can be increased, wear resistance of the sliding bearing during oscillation can be improved, and generation of wear particles can be reduced. The self-lubricating resin composition in which 20 to 30% by weight of AF (chopped fiber and/or milled fiber) as a reinforcement fiber and 10 to 15% by weight of PTFE as a solid lubricating agent are mixed with polyetherketone-based resin so that the total filler amount is 30 to 40% by weight, showed extremely poor adhesion to the metallic surface during insert molding, separation of the resin part due of cutting resistance during grinding or cutting of the sliding surface occurred, and the percentage of adhesion defect due to separation was as high as about 50%. When reducing the amount of addition of AF to not more than 15% by weight, the ratio of defect of adhesion was reduced to 1/10 (one part was separated during processing of 19 parts). Furthermore, by adding not less than 5% by weight of PAN base CF, the adhesive strength was greatly improved, and no defect of adhesion was observed. Therefore, it is desirable that the addition amount of AF be not more than 15% by weight, and more desirably, PAN type CF be added together. In the case in which the total amount of fiber is too small, strength may be insufficient, and in the case in which the amount is too large, the generation of wear particles during sliding may be increased, and service life may be adversely affected. Therefore, the desirable total amount of CF and AF is 10 to 25% by weight.

7. Surface Treatment by Alumina Thermal Spray Coating or Blast Process Using Alumina as Medium In the present invention, it is necessary that the inner circumferential surface of metallic outer ring on which the self-lubricating liner is unified have a surface roughness of not less than $R_a$ 4.0 μm and not less than $R_{max}$ 30.0 μm simultaneously. With this surface roughness, defect of adhesion of the liner can be prevented. In the case in which surface roughness is less than the above values, defect of adhesion by separation may occur. In the present invention, by performing a surface treatment by alumina thermal spray or blast process using alumina, silica or zirconia as a medium prior to injection molding of the self-lubricating liner, the metal surface is provided with a surface roughness satisfying both the above ranges.

8. Integration of the Self-Lubricating Liner and the Outer Ring

In the present invention, the above explained self-lubricating resin composition (machinable liner) and the inner circumferential surface of the metallic outer ring are integrated by injection molding (insert molding), to form the sliding surface. By such a structure, posterior processing of the sliding surface such as cutting and grinding to adjust the inner diameter to the shaft, which cannot be performed in a conventional weaved liner containing PTFE, can be performed. Therefore, when assembling at the user's end, it is possible to accurately adjust the fitting size by processing the inner diameter of the bearing. Furthermore, by using polyetherketone-based resin, a heat-resistant thermoplastic resin, as the matrix, higher productivity can be obtained when compared to the conventional self-lubricating coating using a thermosetting acrylic resin as the matrix.

Comparative Examples, a metallic sleeve made by SUS630 stainless steel heat-treated to H1150 condition, with an inner diameter of 25.4 mm, an outer diameter of 30.2 mm, and a width of 12.7 mm, was used. This sleeve corresponds to the model No. M81934/1-16C016 defined in the AS 81934 standard. The inner circumferential surface of the sleeve was processed by alumina thermal spray treatment to have a surface roughness not less than $R_a$ 4.0 μm and not less than $R_{max}$ 30.0 μm. As a self-lubricating liner of the bearing, each composition having the content shown in Table 1 was formed at the inner diameter of the metallic sleeve by injection molding. The liner was formed to have a thickness so that cutting and grinding finish of the inner diameter was possible in subsequent operation. The liner thickness after finish was set to 0.5 mm in all examples of Table 1.

TABLE 1

| Material added for liner | Example | | | | | | | | | | Comparative Example | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 | 6 | 7 | 8 | 9 | 10 |
| PEEK | 70 | 70 | 70 | 60 | 80 | | | 60 | 70 | 60 | 70 | 70 | 70 | 80 | 80 | 67 | 60 | | | |
| PEK | | | | | | 70 | 70 | | | | | | | | | | | | | |
| Polyimide resin (AURUM JCL3030) | | | | | | | | | | | | | | | | | | 70 | | |
| Acrylic resin (Methacrylate) | | | | | | | | | | | | | | | | | | | 70 | 70 |
| PAN base carbon fiber | 10 | 15 | 5 | 15 | 5 | 10 | 5 | 5 | | 10 | 20 | | | | | 20 | 10 | 30 | | |
| Pitch base carbon fiber | | | | | | | | | | | | 20 | | | | | | | | |
| Glass fiber (Milled fiber 06MW2-20) | | | | | | | | | | | | | | | | | | | 15 | |
| Aramid fiber | | | 10 | 5 | 5 | | 10 | 5 | 15 | 15 | | | 20 | | | | | | | |
| PTFE (low molecular weight type (not more than 100,000) L150J) | | | | | | | | | | | | | | | 20 | | | | 15 | 30 |
| PTFE (high molecular weight type (not less than 1 million)) | 20 | 15 | 15 | 20 | 10 | 20 | 15 | 30 | 15 | 15 | 10 | 10 | 10 | 20 | | 10 | 10 | | | |
| MoS₂ | | | | | | | | | | | | | | | | | 3 | | | |
| Graphite | | | | | | | | | | | | | | | | | | 10 | | |

In the present invention, the surface treatment by alumina thermal spray or blast process to optimize the surface roughness of metallic surface performed before injection molding provides necessary adhesion strength compatible with use in high load condition and makes the bearing suitable for aircraft application.

EXAMPLES AND COMPARATIVE EXAMPLES

Examples 1 to 10 and Comparative Examples 1 to 10

Next, based on Examples and Comparative Examples, the present invention is explained further in detail.

Sleeve bearings of Examples shown in FIG. 1 and Comparative Examples were produced. In all the Examples and 1. Evaluation of Load Capacity A self-lubricating sliding bearing with Teflon (trademark) liner must satisfy the load capacity requirements of SAE standard AS81820 (standard for spherical bearings) or AS81934 (standard for sleeve bearings) to be approved as a bearing for aircraft use. The AS81934 standard is an SAE standard related to a plain or flanged self-lubricating sleeve bearing which is self-lubricating by incorporating polytetrafluoroethylene in a liner in the bore for use in the temperature range of −54 to +163° C. (−65 to +325° F.). As shown in Table 2, since all the Examples and Comparative Examples are sleeve bearings, the load capacity was evaluated in accordance to SAE standard AS81934. This evaluation confirmed that the machinable liner according to the present invention has the same or higher load capacity than the AS81934 standard product.

TABLE 2

| Test | Example | | | | | | | | | | Comparative Example | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 | 6 | 7 | 8 | 9 | 10 |
| Radial static limit load | ○ | ○ | ○ | ○ | ○ | ○ | ○ | ○ | ○ | ○ | ○ | ○ | ○ | ○ | ○ | x | ○ | ○ | ○ | ○ |
| Oscillation test at room temperature | ○ | ○ | ○ | ○ | ○ | ○ | ○ | ○ | ○ | ○ | ○ | x | ○ | ○ | x | x | x | x | ○ | ○ |
| Oscillation test at high temperature | ○ | ○ | ○ | ○ | ○ | ○ | ○ | ○ | ○ | ○ | x | x | x | x | x | x | x | x | x | x |
| Oil resistance test | ○ | ○ | ○ | ○ | ○ | ○ | ○ | ○ | ○ | ○ | ○ | x | ○ | ○ | x | x | x | x | ○ | ○ |

○: Requirement of AS81934 standard was satisfied.
x: Requirement of AS81934 standard was not satisfied.

Each test shown in Table 2 is explained in detail.

1-a. Radial Static Limit Load

AS 81934 standard requirements regarding this test are shown in Table 3. As shown in Table 3, the radial static limit load is defined based on the material of sleeve bearing (aluminum alloy and stainless steel) and inner diameter size. Since all of Examples and Comparative Examples correspond to model No. M81934/1-16C016 defined in the AS81934 standard, the maximum test load was determined to be 140 kN (31,400 lb).

TABLE 3

| Model No. | Radial static limit load (lb) | Oscillation load (lb) |
|---|---|---|
| M81934/1-08A012 | 6,900 | 6,300 |
| M81934/1-08C012 | 10,800 | 6,300 |
| M81934/1-16A016 | 20,000 | 16,500 |
| M81934/1-16C016 | 31,400 | 16,500 |
| M81934/1-24A016 | 30,000 | 22,500 |
| M81934/1-24C016 | 47,100 | 22,500 |

Figure 4:
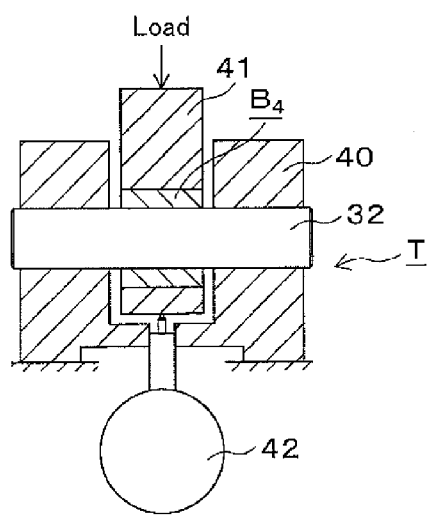
FIG. 4 is a sectional view showing a loading test in an Example of the invention.
Figure 5:
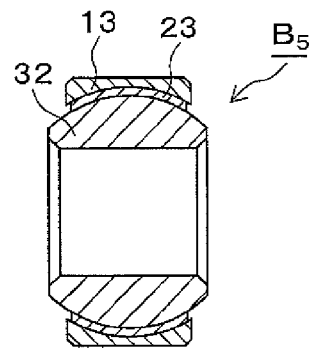
FIG. 5 is a sectional view showing a conventional sliding bearing of the patent document 1.
Figure 6:
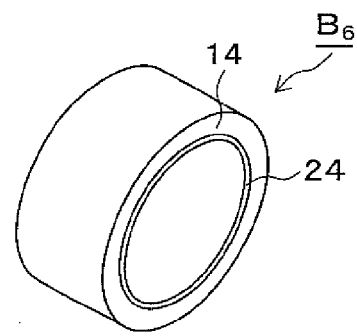
FIG. 6 is a perspective view showing a conventional sliding bearing of the patent document 2.

A plain sleeve bearing $B_4$ was set on a test jig T inserting a pin 32 to the inner diameter, and then the load was applied in the radial direction as shown in FIG. 4. After applying a preload for 3 minutes, a dial gage 42 was set at zero. Then the load was increased gradually up to radial static limit load value 140 kN (31,400 lb). After reaching the limit load value, the load was removed gradually. The displacement was measured by the dial gage 42 during the test, and the permanent set was read from the load-displacement curve at the point the load returned to zero. This permanent set (the maximum permissible permanent deformation after loading of radial static limit load) should not exceed 0.051 mm (0.002 in).

The displacement at the load of 140 kN did not exceed 0.25 mm in all Examples. Furthermore, the permanent set after loading did not exceed 0.051 mm in all Examples, and in Comparative Examples 1 to 4 and 6 to 10. However, the permanent set after loading exceeded 0.051 mm in Comparative Example 5 and did not satisfy the standard.

1-b. Oscillation Test at Room Temperature Under Radial Load

Requirement of AS81934 standard in this test concerning the upper limit value of the wear amount of the liner during oscillation test at room temperature is 0.089 mm (0.0035 in) after 1,000 cycles, 0.102 mm (0.0040 in) after 5,000 cycles, and 0.143 mm (0.0045 in) after 25,000 cycles.

The sleeve bearing $B_4$ was set on a test jig T as shown in FIG. 4, and then oscillation load of 73.5 kN (16,500 lb) according to Table 3 was applied in the radial direction the load was held statically for 15 minutes. After 15 minutes, the dial gage 42 was set to zero, and oscillation of the pin 32 was started. The pin 32 was oscillated by rotating within an angle range of ±25°. The movement of the pin going from the angle position 0° to +25° and coming back to 0°, and then going to −25° and coming back again to 0° was counted as 1 cycle. The oscillation rate was not less than 10 cycles per minute (10 CPM). Wear amount was read from the dial gage 42 and recorded during the oscillation test.

As a result of the test in which oscillation of ±25° (at not less than 10 CPM) was performed under the oscillation load of 73.5 kN applied in radial direction at room temperature as above described, the wear amount of the liner after 25,000 cycles in all the Examples and in Comparative Examples 1, 3, 4, 9 and 10 was not more than 0.143 mm; however, the reminder of Comparative Examples did not satisfy the standard.

1-c. Oscillation Test at High Temperature Condition

Requirement of AS81934 in this test concerning the upper limit value of the wear amount of the liner after oscillation test at high temperature is 0.152 mm (0.0060 in).

The test was performed keeping the temperature of the pin 32 and the liner at 163° C.+6° C./−0° C. in the test jig T shown in FIG. 4, with the oscillation angle of ±25° (at not less than 10 CPM) under a oscillation load of 73.5 kN applied in the radial direction. As a result, the wear amount of the liner after 25,000 cycles did not exceed 0.152 mm in all the Examples while none of the Comparative Examples satisfied the standard.

1-d. Oil Resistance Test (Fluid Compatibility Test)

Requirement of AS81934 in this test concerning the upper limit value of wear amount of liner after the oil resistance test is 0.152 mm (0.0060 in).

The bearings having machinable liner according to the present invention was immersed for 24 hours in each of the oil agents cited below at 71° C.±3° C. except for oil agent b which was at 43° C.±3° C. Then, the oscillation test at room temperature was performed within 30 minutes after removal from the oil agent. Furthermore, regarding oil agent e, the load condition was 75% of the oscillation load specified in table 3.

Oil agent a: Skydrol (trademark) 500B operating fluid
Oil agent b: MIL-DTL-5624 turbine fuel oil JP4 or JP5
Oil agent c: MIL-PRF-7808 lubricating oil
Oil agent e: AS 8243 antifreeze agent
Oil agent f: MIL-PRF-83282 operating fluid The results of the above test confirmed that, in the oscillation test after immersion in the oil agent for 24 hours, regarding all the oil agents, the wear amount of the liner after 25,000 cycles did not exceed 0.152 mm in all the Examples and in Comparative Examples 1, 3, 4, 9 and 10. However, the reminder of Comparative Examples did not satisfy the standard.

Next, in addition to the components in Table 1, examples of materials applicable to the present invention are mentioned.

Polyetherketone-Based Resin:
  Polyetheretherketone (PEEK)
  Polyetherketone (PEK)

PTFE Powder (all of them are of the High Molecular Weight Type):
  L169E, average particle diameter (50% particle diameter): 17 μm, melting point: 332° C., produced by Asahi Glass Co., Ltd.
  KT-600M, average particle diameter (50% particle diameter): 14 μm, melting point: 332° C., produced by Kitamura Ltd.
  KTH-645, average particle diameter (50% particle diameter): 14 μm, melting point: 333° C., produced by Kitamura Ltd.

Carbon Fiber (PAN Type):
  HTA C6-UH, strength: 4000 MPa, elasticity coefficient: 240 GPa, produced by Toho Tenax Co., Ltd.
  TV14-006, strength: 4900 MPa, elasticity coefficient: 235 GPa, produced by Toray Industries, Inc.
  It should be noted that a liner with pitch type carbon fiber could not satisfy the AS81934 standard.

Aramid Fiber:
  Chopped fiber, Technora T-324, produced by Teijin Ltd.
  Milled fiber, Towaron Tw5011, produced by Teijin Ltd.

2. Research of Surface Treatment of Metallic Sleeve

In the present invention, to obtain an appropriate adhesion between metal and machinable liner, the surface treatment making the metal surface into a surface roughness not less than $R_a$ 4.0 μm and not less than $R_{max}$ 30 μm can be performed. As a surface treatment method, alumina thermal spray or blast treatment using alumina, silica or zirconia as a medium can be mentioned. Table 4 shows the comparison result of surface treatment method of the present invention and other surface treatment methods.

It should be noted that the calorizing treatment (aluminum diffusion coating) is a metallic surface improving treatment in which alumina ($Al_2O_3$) coating is farmed on the metal surface by performing a diffusion of aluminum on the metal surface. The Alplex (trademark) treatment is a treatment having higher performance compared to the calorizing treatment, and it is a metallic surface improving treatment in which corrosion resistance and wear resistance are further improved by forming ceramic layer like alumina layer in a matrix of the calorizing layer. ZAC coating by Tocalo Co., Ltd is a ceramic coating consisting of a chromium oxide ($Cr_2O_3$) basis compound ceramic.

ing surface. Furthermore, regarding the Comparative Example 14 in which injection molding was performed after blast treatment at a pressure of 0.3 MPa, separation also occurred during cutting or grinding the sliding surface. Note that none of Comparative Examples was satisfying the surface roughness requirement of not less than $R_a$ 4.0 μm and not less than $R_{max}$ 30.0 μm after surface treatment. Since the separation occurred at this step, no subsequent verification test was performed.

3. Investigation of the Shape of Metallic Sleeve Inner Diameter

The effect of the inner diameter shape of metallic sleeve was investigated by comparing the load capacity of the sleeves with different inner diameter shapes, namely, a straight shape, an hourglass shape (Example 18), and a barrel shape (Example 19), through the load tests. The smaller maximum displacement and permanent set at the same radial load

TABLE 4

| | Comparative Example 11 | Comparative Example 12 | Comparative Example 13 | Comparative Example 14 | Example 11 | Example 12 | Example 13 | Example 14 | Example 15 | Example 16 | Example 17 |
|---|---|---|---|---|---|---|---|---|---|---|---|
| Surface treatment | Calorizing treatment | Alplex treatment | ZAC coating | Blast treatment Medium: Alumina, Particle diameter: 707-595 μm, Pressure: 0.3 MPa | Alumina thermal spray | Blast treatment Medium: Alumina, Particle diameter: 707-595 μm, Pressure: 0.4 MPa | Blast treatment Medium: Alumina, Particle diameter: 841-707 μm, Pressure: 0.4 MPa | Blast treatment Medium: Silica, Particle diameter: 707-595 μm, Pressure: 0.4 MPa | Blast treatment Medium: Silica, Particle diameter: 841-707 μm, Pressure: 0.4 MPa | Blast treatment Medium: Zirconia, Particle diameter: 841-707 μm, Pressure: 0.4 MPa | Blast treatment Medium: Zircon (Zirconia + Silica), Particle diameter: 850-630 μm, Pressure: 0.4 MPa |
| Surface roughness $R_a$ (μm) | 2.4 | 0.7 | 3.2 | 3.6 | 6.3 | 4.1 | 4.7 | 4.0 | 4.3 | 4.5 | 4.5 |
| Surface roughness $R_{max}$ (μm) | 15.5 | 4.6 | 16.4 | 31.6 | 54.4 | 34.7 | 38.4 | 30.9 | 35.2 | 36.1 | 36.9 |
| Result of adhesion test | Liner separation | Liner separation | Liner separation | Liner separation | No liner separation | No liner separation | No liner separation | No liner separation | No liner separation | No liner separation | No liner separation |

Examples 11 to 17

After the alumina thermal spray or blast treatment using several kinds of medium was performed to Examples 11 to 17 as indicated in Table 4, injection molding was performed to form the machinable liner. Separation did not occur during cutting and grinding the sliding surface of Examples 7 to 9. Furthermore, durability test was performed under the below-mentioned temperatures, times, and pressures, and it was verified that separation between sleeve and machinable liner did not occur in any of the Examples.
Keeping the bearing at −196° C. for 15 minutes by immersing in liquid nitrogen
Oscillation test under −55° C. and surface pressure of 120 MPa
Oscillation test under 163° C. and surface pressure of 275 MPa Comparative Examples 11 to 14

Figure 9:
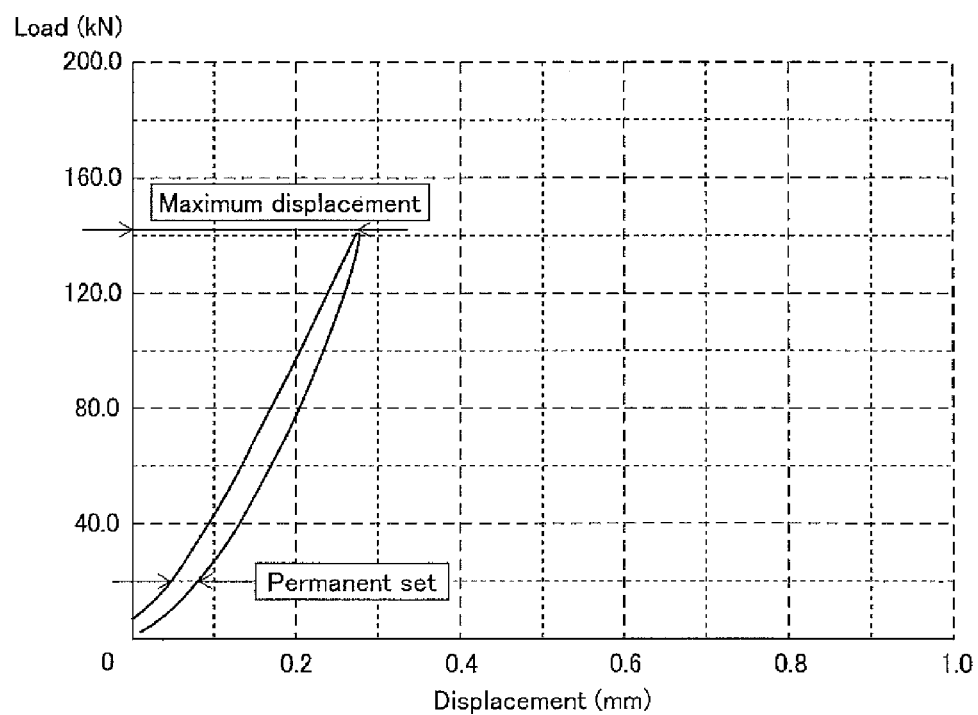
FIG. 9 is a graph showing a typical example of a load-displacement curve.

After performing calorizing treatment, Alplex treatment or ZAC coating to Comparative Examples 11 to 13 respectively, injection molding was performed to form the machinable liner. Separation occurred during cutting or grinding the slidmeans that the shape provides better load capacity. The test load was 140 kN. After a pre-load of 7.0 kN applied for 3 minutes, the load was increased statically up to 140 kN, and then removed statically. According to the required value, permanent set for a test load of 140 kN should not exceed 0.051 mm. A typical load-displacement curve of the test is shown in FIG. 9.

Example 18

Figure 7:
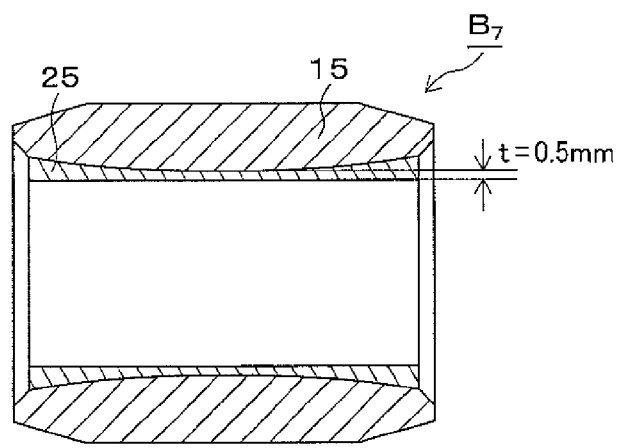
FIG. 7 is a sectional view showing a conventional sliding bearing in an Example of the invention.

By decreasing gradually the inner diameter size of metallic sleeve 15 toward axially central part, that is, forming the sleeve inner diameter surface into an hourglass shape as shown in FIG. 7, the sleeve bearing $B_7$ with a self-lubricating liner 25 of the present invention formed by injection molding was prepared. Since the inner diameter surface of the liner 25 is straight (cylindrical), the thickness of the liner decreases gradually from both edges of the sleeve bearing $B_7$ toward the axially central part of the sleeve. The minimum thickness at the central part was set to 0.5 mm.

Example 19

Figure 8:
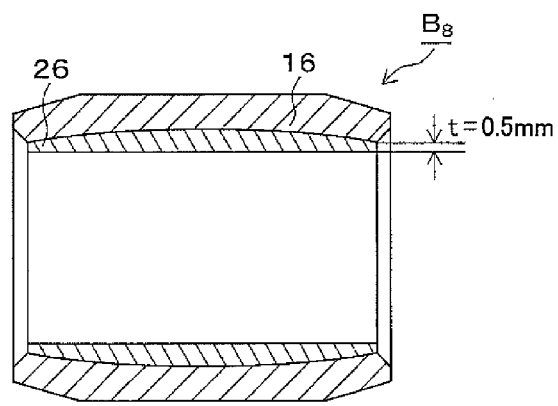
FIG. 8 is a sectional view showing a conventional sliding bearing in an Example of the invention.

By increasing gradually the inner diameter of metallic sleeve 16 toward axially central part, that is, forming the sleeve inner diameter surface into a barrel shape as shown in FIG. 8, the sleeve bearing $B_8$ with a self-lubricating liner 26 of the present invention formed by injection molding was prepared. Since the inner diameter surface of the liner 26 is straight, the thickness of the liner increases gradually from both edges of the sleeve bearing $B_8$ toward the axially central part of the sleeve. The minimum thickness at the edge part was set to 0.5 mm.

According to the test result, in the case of Example 18 having the hourglass shape inner diameter, the liner could be prevented from projecting to the outside from an edge part of the bearing when it was compressed by a radial load since the thickness at the central part was thinner than at the both edge parts.

Furthermore, in the case of Example 19 having the barrel shape inner diameter, the axial force caused in posterior processing of the liner to adjust the size could be supported by the edge parts of the curved wall. Therefore, the liner was prevented from separation during the size adjustment process. Furthermore, even when the liner material at the central part is compressed when receiving a radial load during the use of the sleeve bearing, since the concave shape of the edge part prevents the liner material from flowing along the axial direction, the liner can be prevented from projecting to the outside from the edge part of bearing.

Results of the load test are shown in Table 5. All types of the inner diameter shape exhibited permanent set less than 0.051 mm and consequently they were acceptable compared to the standard value. The differences in maximum displacement due to the inner diameter shape of the metallic sleeve were not significant. However, the permanent sets in the cases of hourglass shape and barrel shape were significantly small compared to the case of straight shape. This means that the inner diameter having the hourglass shape or the barrel shape is more advantageous for improving load capacity.

TABLE 5

| Inner diameter shape of metallic sleeve | Maximum displacement (mm) | Permanent set (mm) | Evaluation by standard value |
| --- | --- | --- | --- |
| Straight shape | 0.276 | 0.034 | Acceptable |
| Hourglass shape | 0.268 | 0.022 | Acceptable |
| Barrel shape | 0.272 | 0.018 | Acceptable |

The present invention can be appropriately applied to a sliding bearing for aircraft use or the like, which requires low friction coefficient, high durability, high load capacity, high heat resistance and high oil resistance.

EXPLANATION OF REFERENCE NUMERALS $B_1$ to $B_3$, $B_7$, B: Bearing according to the invention,
$B_4$: Bearing of Example and Comparative Example,
$B_5$ and $B_6$: Conventional bearing,
T: Test jig,
10, 11, 13 to 16: Outer ring (sleeve),
12: Outer ring member,
20 to 26: Self-lubricating liner,
30 to 32: Inner ring (shaft),
40: Jig block,
41: Test housing,
42: Dial gage.

What is claimed is:

1. A self-lubricating resin comprising:
   60 to 80% by weight of a polyetherketone-based resin,
   10 to 30% by weight of polytetrafluoroethylene having a molecular weight of not less than 1,000,000, and
   10 to 25% by weight of added fibers consisting of 5 to 15% by weight of a polyacrylonitrile-based carbon fiber and 5 to 15% by weight of aramid fiber;
   wherein the self-lubricating resin composition contains no graphite.

2. A sliding bearing comprising:
   a sliding surface, and
   a self-lubricating liner formed on the sliding surface, the self-lubricating liner being a self-lubricating resin comprising:
   60 to 80% by weight of a polyetherketone-based resin,
   10 to 30% by weight of polytetrafluoroethylene having a molecular weight of not less than 1,000,000, and
   10 to 25% by weight of added fibers consisting of 5 to 15% by weight of a polyacrylonitrile-based carbon fiber and 5 to 15% by weight of aramid fiber;
   wherein the self-lubricating resin composition contains no graphite.

3. The sliding bearing according to claim 2, wherein the sliding bearing is a sleeve bearing comprising the self-lubricating liner formed on an inner circumferential surface of the sleeve.

4. The sleeve bearing according to claim 3, comprising a flange wherein the self-lubricating liner is formed on a flange surface.

5. The sleeve bearing according to claim 3, wherein an inner diameter of the sleeve decreases from an edge part toward an axially central part of the sleeve, and the inner circumferential surface of the self-lubricating liner is cylindrical.

6. The sleeve bearing according to claim 3, wherein an inner diameter of the sleeve increases from an edge part toward an axially central part of the sleeve, and the inner circumferential surface of the self-lubricating liner is cylindrical.

7. The sliding bearing according to claim 2, wherein the sliding bearing is a spherical bearing comprising the self-lubricating liner formed on a spherical surface.

8. The spherical bearing according to claim 7, comprising an outer ring member with a spherical inner circumferential surface, wherein the self-lubricating liner is formed on the spherical inner circumferential surface.

9. The spherical bearing according to claim 8, wherein the outer ring member comprises a screw part extending in a radial direction of the outer ring member.

10. The spherical bearing according to claim 8, wherein an inner diameter of the outer ring member decreases from an edge part toward an axially central part of the outer ring member, and the inner circumferential surface of the self-lubricating liner is cylindrical.

11. The sleeve according to claim 8, wherein an inner diameter of the outer ring member increases from an edge part toward an axially central part of the outer ring member, and the inner circumferential surface of the self-lubricating liner is cylindrical.

12. The sliding bearing according to claim 1, wherein the self-lubricating liner is machinable.

13. A method of producing a sliding bearing comprising:
   a step of processing a metallic sliding surface,
   a step of mixing together:
   60 to 80% by weight of poly ether ketone-base resin,
   10 to 30% by weight of polytetrafluoroethylene having a molecular weight of not less than 1,000,000,
   5 to 15% by weight of polyacrylonitrile-based carbon fiber, and
   5 to 15% by weight of aramid fiber, so that a total amount of the carbon fiber and the aramid fiber is 10 to 25% by weight to obtain a self-lubricating resin composition, and a step of injection molding the self-lubricating resin composition to form the self-lubricating liner on the metallic sliding surface of the sliding bearing;

wherein the self-lubricating resin composition contains no graphite.

14. The method according to claim 13, wherein the step of processing the metallic sliding surface comprises a step of treating the metallic sliding surface by alumina thermal spray or blast process so that a surface roughness in terms of center line average roughness is not less than $R_a$ 4.0 µm and a surface roughness in terms of maximum height is not less than $R_{max}$ 30.0 µm.

* * * * *